April 18, 1961  J. A. SCHNEIDER  2,980,085
ROTARY THRUSTER
Filed April 1, 1960
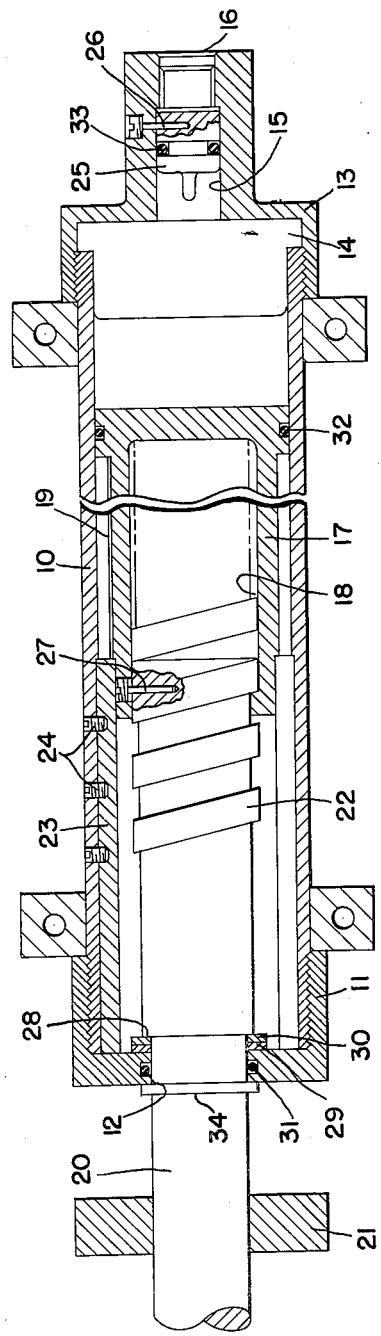
INVENTOR.
JOHN A. SCHNEIDER
BY
S.J. Rotondi, A.J. Dupont & S. Duhoff United States Patent Office 2,980,085
Patented Apr. 18, 1961

2,980,085
ROTARY THRUSTER

John A. Schneider, Philadelphia, Pa., assignor to the United States of America as represented by the Secretary of the Army Filed Apr. 1, 1960, Ser. No. 19,433

1 Claim. (Cl. 123—24)

(Granted under Title 35, U.S. Code (1952), sec. 266)

The invention described herein may be manufactured and used by or for the Government for governmental purposes without the payment to me of any royalty thereon.

This invention relates to gas pressure operated mechanisms, and more particularly to a rotary thruster which is operable over a range of more than a single revolution.

The rotary thrusters heretofore available generally have been capable of producing rotational movement only through an angle of somewhat less than three hundred and sixty degrees. This restriction in rotational movement involves the use of a relatively large pulley where the thruster is required to reel in a mass over a considerable distance. For use on board aircraft, it is desirable that the size and weight of the thruster be reduced to a minimum. The present invention achieves this result by the provision of an improved rotary thruster which is operable over more than a single revolution.

The invention will be better understood from the following description when considered in connection with the accompanying drawing and its scope is indicated by the appended claim.

The single figure of the drawing is a sectional view of the improved rotary thruster.

This thruster includes a cylinder 10 which has at one end a cap 11 having a central opening 12 and at the other end a cap 13 formed to anchor a cartridge 14 in the cylinder 10 and to provide a passageway 15 having a gas inlet 16. A hollow piston 17, movable in the cylinder 10, has an internal thread 18 and an external longitudinal key 19. A piston rod or shaft 20, extending through the central opening 12 and bearing a drive pulley 21, has at its inner end an external thread 22 which meshes with the internal thread 18.

A member 23, fixed to the inner periphery of the cylinder 10 by screws 24, forms a guideway for the key 19.

A firing pin 25 is fixed to the wall of the pasageway 15 by a shear pin 26 and is movable in this passageway upon the application of a gas pressure through the gas inlet 16.

The rod or shaft 20 is coupled to the piston 17 by a shear pin 27 and has a shoulder 28. Between this shoulder and the inner end surface of the cap 11 are a pair of washers 29 and 30. These washers provide a bearing surface and coupled with the snap ring 34 prevent endwise movement of the shaft. Seal rings 31, 32 and 33 are provided between the rod 20 and the cap 11, between the piston 17 and the cylinder 10 and between the cap 13 and the firing pin 25.

In the operation of the thruster, a gas pressure is applied through the inlet 16. This shears the pin 26 and drives the firing pin 25 against the primer of the cartridge 14. The gas pressure generated by the firing of the cartridge shears the pin 27 and forces the piston 17 against the rod 20. Since the rod 20 is restrained from endwise movement and the piston 17 cannot rotate, the force generated by the firing of the cartridge functions through the meshing threads 18 and 22 to rotate the rod 20 and the pulley 21 which is fixed to the rod.

As previously indicated, the thread coupling between the piston 17 and the rod 20 has the important advantage that it increases the rotational movement of the rod 20, thus permitting the use of a smaller pulley and resulting in a more compact thruster. While the cartridge has been illustrated as fired by the application of a gas pressure, it is to be understood that it may be percussion fired or electrically initiated if desired.

I claim:

In a mechanism for producing rotary motion, the combination of a cylinder having at one end a cap with a central opening and at the other end a cap formed to anchor a cartridge in said cylinder and to provide a passageway having an inlet, a hollow piston movable in said cylinder, said piston having an internal thread and an external longitudinal key, a piston rod extending through said central opening and having at its inner end an external thread meshing with said internal thread, said piston having a shoulder bearing against the inner surface of the cap through which it extends, means fixed to the inner periphery of said cylinder to form a guideway for said key, a firing pin movable in said passageway, and a shear pin coupling said firing pin to the wall of said passageway, said firing pin being movable to fire said cartridge upon the shearing of said shear pin.

References Cited in the file of this patent

UNITED STATES PATENTS 2,204,308   Herzmark _____ June 11, 1940